United States Patent Office 3,111,837
Patented Nov. 26, 1963

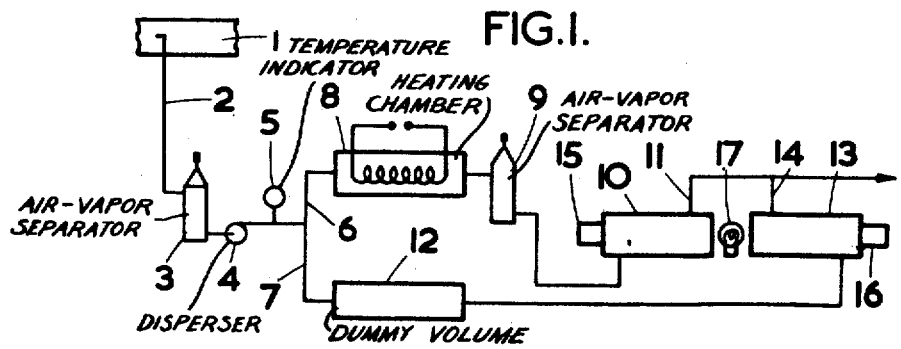
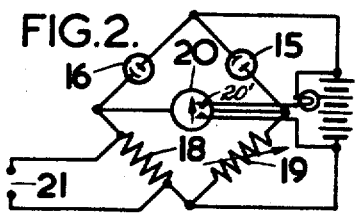
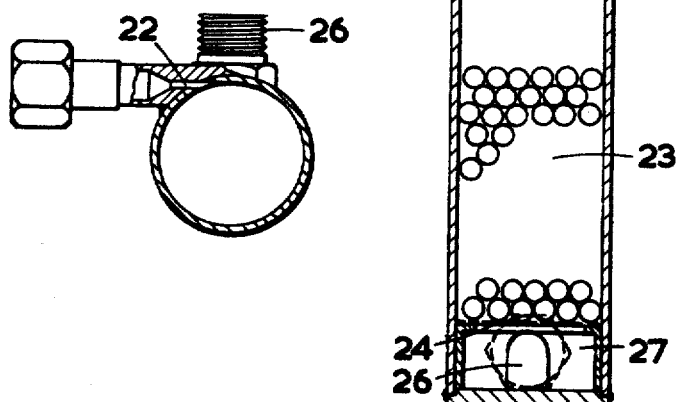

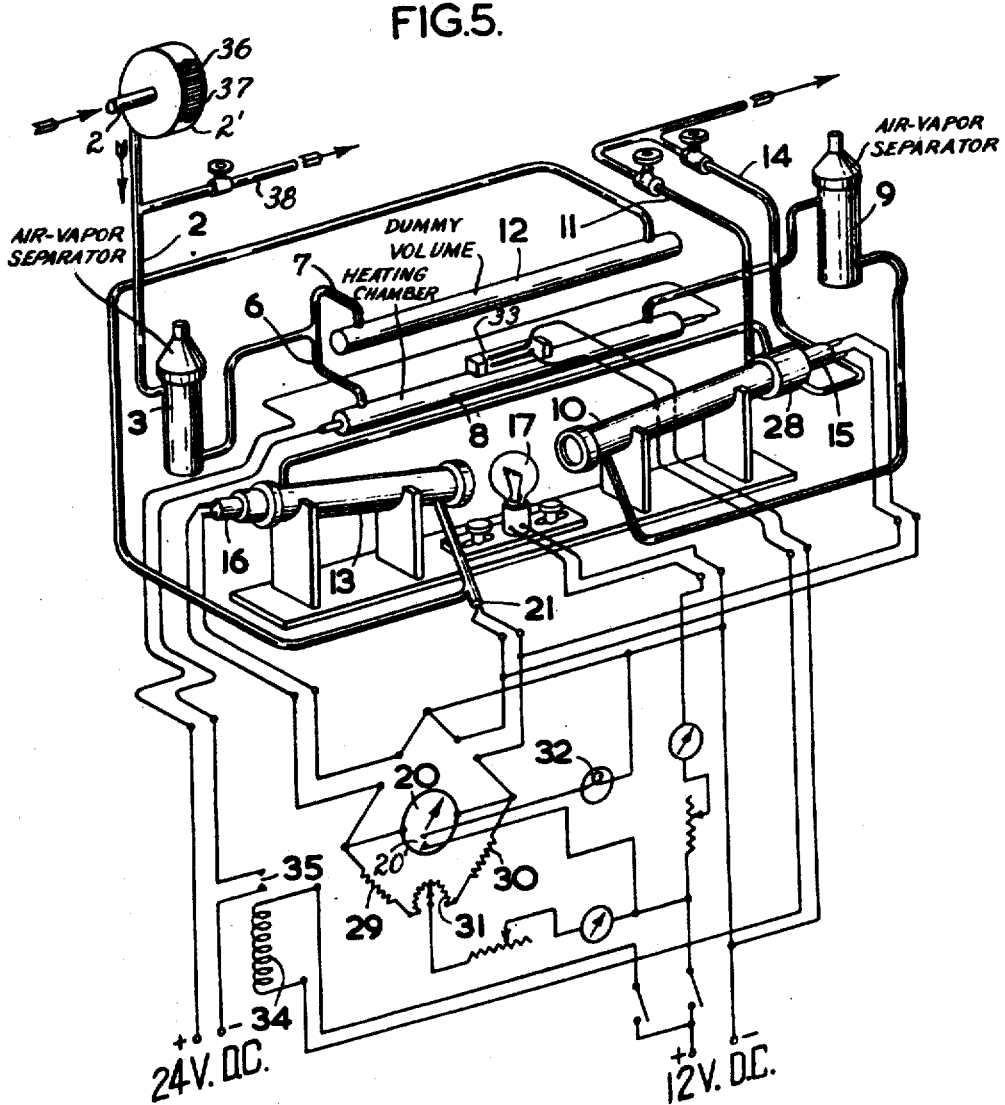

3,111,837
METHOD OF DETECTING LIQUIDS SUSPENDED IN OTHER LIQUIDS
Norman Evans, Kenneth Wicks, and Gordon John Smith, all of Sunbury-on-Thames, England, assignors to The British Petroleum Company Limited, London, England, a joint-stock corporation of Great Britain
Filed Oct. 11, 1960, Ser. No. 61,895
Claims priority, application Great Britain Oct. 20, 1959
24 Claims. (Cl. 73—53)

The invention relates to a method of detecting in a liquid minor amounts of a suspended liquid which increases in solubility with increasing temperature. The invention relates particularly to the detection of water suspended in liquid hydrocarbons and especially in aviation fuels for example aviation kerosines.

The objections to the presence of water in aviation fuels are well known, and there is a need for a satisfactory method of continuously and quantitatively testing fuel being loaded to aircraft for the presence of water.

The present invention uses a light absorption method, and according to the present invention a method for detecting minor amounts of a liquid suspended in another liquid comprises splitting a sample of the material to be tested into two streams, heating one of the streams to increase the solubility of the suspended liquid in the other liquid, passing a beam of light through each stream and comparing the light absorption of each stream.

The invention is particularly suitable for detecting the presence of suspended water in a hydrocarbon or hydrocarbon mixture, for example an aviation fuel and in particular an aviation kerosine.

The amount of suspended liquid which may be measured by the method of the present invention is limited by the solubility of the suspended liquid in the other liquid at the temperature at which appreciable vaporisation of the lower boiling liquid commences. In the case of water suspended in aviation kerosine the method may suitably be used for measuring quantities of up to 500 parts of suspended water per million parts of kerosine.

Preferably the heated stream is heated to a temperature such that all the suspended liquid is dissolved. In this way the heated stream becomes a reference sample and the effect on the difference in light absorption in each stream due to other factors, for example the presence of any suspended solids, is eliminated. With this preferred method a quantitative value for the total suspended liquid can be obtained. However, if the method is to be used to determine whether the amount of suspended liquid exceeds a certain given amount, it may not be necessary to dissolve all the suspended liquid in the one stream, provided the amount dissolved is at least as great as the allowable given amount. The increase of solubility with increase in temperature can be readily determined for any two liquids by simple tests.

Preferably the liquids are agitated under standard conditions prior to the measurement of light absorption so that any suspended liquid particles are dispersed to form a size range which is reproducible from sample to sample. Since light absorption varies with particle size this assists in obtaining repeatability and counteracts any variation in the size range of particles from sample to sample.

If the total of suspended plus dissolved liquid is required, the temperature of the material being tested can be determined prior to splitting. The amount of dissolved liquid will be directly related to the temperature and the total dissolved plus suspended liquid can thus be found.

Preferably the material to be tested is treated to remove any vapour and/or air bubbles which could affect the light absorption. This treatment, which may be carried out in any convenient form of air/vapour separator, should be given to the material to be tested before the material enters the light absorption cells. It may conveniently be done by treating the material before it is split into two streams preferably after the material has passed through a disperser. It has, however, been found particularly desirable to treat the heated stream after it leaves the heater and before it enters the light absorption cell so that any entrained air or air driven out of solution by heating or any vapour formed during the heating is removed. Such treatment is desirably given whether or not the material to be heated has already been given one such treatment before heating.

The light absorption can be measured in any convenient way, for example by means of photo-electric cells connected to an electrical bridge circuit.

If the present invention detects the presence of an excessive quantity of suspended liquid, the material undergoing test can subsequently be treated to remove the suspended liquid by any convenient method for example by selective absorption or by the use of mechanical separators.

The invention includes an apparatus for detecting minor amounts of a liquid suspended in a liquid comprising a line for the material to be tested which is split into two branches, means for heating the material in one of the branches, a light-absorption cell in each branch with a photo-electric cell attached to each, a source of light and means for comparing the light absorption in each cell.

The apparatus preferably includes at least one disperser situated before the light absorption cells. A particularly suitable form of disperser comprises a disc having a serrated edge rotatable inside a casing, the clearance between the serrated edge and the casing being adjusted to give the required suspended particle size range. Such a disperser may, for example, comprise a centrifugal pump, the impeller of which is replaced by a disc having a serrated edge, the clearance between the edge of the disc and the pump casing being adjusted to give the required suspended particle size range. Operation of the disperser should be such that there is no substantial rise in temperature of the sample to be tested. The temperature may be controlled by drawing through the disperser an amount of material in excess of that to be tested and passing the excess material from the discharge side of the disperser to waste. The amount of excess material should be sufficient to absorb any heat generated in the disperser. The disperser is preferably situated in the sample line before splitting and preferably before the air/vapour separators hereinafter described.

The apparatus also preferably includes one or more air/vapour separators to remove air and/or vapour bubbles. These should be positioned in the apparatus so that the material in both streams has passed through a separator prior to passing through the light absorption cells. This may be achieved by means of an air/vapour separator situated in the line before splitting, preferably after a disperser. It is particularly preferred to have an air/vapour separator between the heater and the light absorption cell of the heated branch. A convenient form of air-separator is one in which the material is injected tangentially into a chamber to form a vortex, the vortex being subsequently broken by a layer of suitable inert particles, for example glass beads, which also serves to coalesce any air or vapour bubbles present.

The heater may be of any convenient type for example an electrical immersion heater or a jacket type heated by electricity or a suitable liquid. The capacity of the heater may vary depending on the purpose for which the apparatus is used and the throughput of the apparatus, but for the preferred use for measuring suspended water in hydrocarbon fuels it should be capable of raising the temperature of the fuel sample in the heated branch to about 80° C.

The apparatus may include a temperature indicator which may be coupled with a transmitter and summating device enabling the dissolved water and total water content of the fuel to be recorded. The dissolved water content of a saturated solution at any given temperature is constant and provided that there is some free water present the solution will be saturated.

The apparatus preferably includes a means for cooling the photoelectric cell which is attached to the light absorption cell in the heated branch of the line, for example a jacket surrounding this photo-electric cell through which a cooling fluid may be passed. The unheated portion of the sample may conveniently be used as the cooling fluid by leading the unheated branch of the line from its light absorption cell through the jacket.

The apparatus may include suitable valves as required for operating the instrument and may also include a pressure indicator. The rate of flow of the material to be tested through the indicator may conveniently be controlled by operating a suitable valve in conjunction with a pressure gauge situated downstream from said valve.

An electrical bridge circuit may conveniently be used to indicate changes in the absorption of light passing through the light absorption cells, and the circuit may include an alarm system. The alarm system may operate an alarm light, a bell or other warning signal and may also be made to operate either a shut-off system or a by-pass system to divert fuel from the aircraft should the amount of suspended liquid exceed the predetermined maximum.

Before operating the instrument, it may be calibrated against standard optical absorbers of known light absorption characteristics.

The invention is illustrated and described in relation to the accompanying FIGURES 1–5.

FIG. 1 is a flow diagram indicating the passage of the sample to be treated through the apparatus.

FIG. 2 shows a suitable electrical circuit for measuring any change in light absorption and an alarm system.

FIG. 3 is a vertical section through a suitable type of air/vapour separator.

FIG. 4 is a plan view of the air/vapour separator.

FIG. 5 is a schematic view of the apparatus incorporating certain preferred embodiments and a line diagram of a suitable electrical circuit.

In FIG. 1, in an aircraft fuel-loading system, a sample is taken from the main fuel-to-aircraft line 1 through a sample line 2 to an air/vapour separator 3, disperser 4 and temperature indicator 5. The sample line then splits into two branches 6 and 7. Branch 6 passes through an electrical heating chamber 8 to an air/vapour separator 9 and thence to light absorption cell 10 and out to waste via line 11. Branch 7 passes through a dummy volume 12 to light absorption cell 13 and out to waste via line 14. Photo-electric cells 15 and 16 are attached to light absorption cells 10 and 13 respectively which have a common light source 17. Photo-electric cells 15 and 16 are connected to an electrical bridge circuit of the type illustrated in FIG. 2.

In FIG. 2, photo-electric cells 15 and 16 form two adjacent arms of an electrical bridge circuit, the other two arms being fixed resistor 18 and variable resistor 19. The bridge arm comprises an indicator 20 which incorporates an alarm relay 21' which may be set to operate at any desired level, alarm light 32 lighting up if this level is exceeded. Tappings from either side of fixed resistor 18 lead to electrodes 21 which are set in one of the fuel lines as a safeguard against total water being pumped to the aircraft.

In FIG. 5, which incorporates a number of preferred embodiments, a sample is taken from the main fuel-to-aircraft line (not shown) through sample line 2 to a disperser 2' and air/vapour separator, 3. The sample line splits into two branches 6 and 7. Branch 6 passes through an electrical heating chamber 8 to an air/vapour separator 9 and thence to light absorption cell 10 and out to waste via line 11. Branch 7 passes through a dummy volume 12 to light absorption cell 13 and out through jacket 28 surrounding photoelectric cell 15 to waste via line 14. Photo-electric cells 15 and 16 are attached to light absorption cells 10 and 13 respectively which have a common light source 17. Photo-electric cells 15 and 16 are connected to an electrical bridge circuit where they form two adjacent arms of the circuit, the other two arms being resistors 29 and 30 having a centre tapping 31. The bridge arm comprises an indicator 20 which incorporates an alarm relay 20' which may be set to operate at any desired level, alarm light 32 lighting up if this level is exceeded. The temperature in heater 8 is controlled by thermostat 33 which operates contacts 35 through coil 34. Tappings from either side of photo-electric cell 15 lead to electrodes 21 which are set in the inlet to light-absorption cell 13 as a safeguard against total water being pumped to the aircraft.

Fuel passing along the sample line 2 passes into a disperser 2' where any suspended water particles are reduced to a reproducible size range. This disperser may be a modified centrifugal pump as hereinbefore described comprising a disc 36 having a serrated edge rotatable inside a casing 37, the temperature in the disperser being controlled by drawing through the disperser an amount of fuel in excess of that to be tested and passing the excess fuel from the discharge side of the disperser to waste through a valved line 38, the amount of excess fuel being sufficient to absorb the heat generated in the disperser. The fuel sample then passes through air/vapour separator 3 and subsequently splits along branches 6 and 7. As the solubility of water in aviation fuel increases appreciably with temperature, any free water present in the fuel in branch 6 is dissolved in heater 8 and a fuel free of suspended water, passes through air/vapour separator 9 into light absorption cell 10. The unheated fuel passing through branch 7 retains any cloudiness due to the presence of free water as it passes to light absorption cell 13 via dummy volume 12. The unheated portion of the sample passes from light absorption cell 13 through jacket 28 surrounding photo-electric cell 15 to waste via line 14. This controls the temperature of photo-electric cell 15 and minimises any instability in the output of photo-electric cell 15 due to the heating effect of material in light absorption cell 10. Photo-electric cells 15 and 16 are of the resistance changing type and any water particles present in absorption cell 13 will disperse the beam of light from source 17 and alter the resistance of photo-electric cell 16.

The fuel in absorption cell 10 provides a continuous reference sample. Any suspended solids present will be divided between the absorption cells 10 and 13 and the relative effect due to suspended solids will be nil. The dummy volume 12 ensures that there is no time lag in the flow of fuel through cell 10 compared with cell 13. Any alteration in the resistance of photo-electric cell 16 due to the presence of water particles will cause a deflection on the bridge arm indicator 20 which may be calibrated in parts of water per million parts of fuel.

As shown in FIGURES 3 and 4, the material being tested is injected into the air/vapour separator or separators via a jet 22 to form a vortex in the upper part of the separator. The vortex is broken by the layer of glass beads 23 which is supported on a gauze 24. This layer also coalesces any air or vapour bubbles, the air and vapour being removed via line 25. The material being tested leaves the separator via line 26 and free space 27.

We claim:

1. A method for detecting minor amounts of a liquid suspended in another liquid comprising splitting a sample of a material to be tested into two streams, heating one of the streams to increase the solubility of the suspended liquid in the other liquid, passing a beam of light through each stream and comparing the light absorption of each stream.

2. A method as claimed in claim 1, wherein the suspended liquid is water and the other liquid comprises a hydrocarbon mixture.

3. A method as claimed in claim 2, wherein the non-suspended liquid is an aviation fuel.

4. A method as claimed in claim 3, wherein the aviation fuel is an aviation kerosine.

5. A method as claimed in claim 4, wherein the water is suspended in the aviation kerosine in quantities of up to 500 p.p.m.

6. A method as claimed in claim 1, wherein the heated stream is heated to a temperature such that all the suspended liquid is dissolved.

7. A method as claimed in claim 1, wherein any suspended liquid particles are dispersed prior to the measurement of the light absorption to form a size range which is reproducible from sample to sample.

8. A method as claimed in claim 1, wherein the material to be tested is treated to remove any vapour and air bubbles prior to the measurement of the light absorption.

9. A method as claimed in claim 8, wherein the material to be tested is treated for the removal of any vapour and air bubbles before it is split into two streams.

10. A method as claimed in claim 9, wherein the material to be tested is treated for the removal of vapour and air bubbles after passing through a disperser.

11. A method as claimed in claim 1, wherein the material in the heated stream is treated to remove vapour and air bubbles prior to the measurement of the light absorption.

12. An apparatus for detecting minor amounts of a liquid suspended in another liquid comprising a line for the material to be tested which is split into two branches, means for heating the material in one of the branches, a light absorption cell in each branch, a photo-electric cell attached to each light absorption cell, a source of light and means for comparing the light absorption in each light absorption cell.

13. An apparatus as claimed in claim 12, which includes at least one disperser situated before the light absorption cells.

14. An apparatus as claimed in claim 13, wherein the disperser comprises a disc having a serrated edge which may be rotated inside a casing, the clearance between the disc and the casing being adjusted to give the required suspended particle size range.

15. An apparatus as claimed in claim 14, wherein the dispenser is capable of treating an amount of material in excess of that to be tested so that the excess material absorbs any heat generated in the disperser and passes from the discharge side of the disperser to waste.

16. An apparatus as claimed in claim 12, which includes at least one air/vapour separator positioned before the light absorption cells.

17. An apparatus as claimed in claim 12 wherein an air/vapour separator is situated in the line prior to splitting.

18. An apparatus as claimed in claim 17, wherein the air/vapour separator is situated in the line after a disperser.

19. An apparatus as claimed in claim 16, wherein an air/vapour separator is situated between the heater and the light absorption cell of the heated branch.

20. An apparatus as claimed in claim 12, which includes a means for cooling the photo-electric cell which is attached to the light absorption cell in the heated branch of the line.

21. An apparatus as claimed in claim 20, wherein the means for cooling comprise a jacket surrounding the photo-electric cell through which a cooling fluid may be passed.

22. An apparatus as claimed in claim 21, wherein the unheated branch of the line leads from its light absorption cell through the jacket.

23. An apparatus as claimed in claim 12, wherein the means for comparing the light absorption in the light absorption cells comprises an electrical bridge circuit.

24. An apparatus as claimed in claim 23, wherein the electrical bridge circuit includes an alarm system which operates should the amount of suspended liquid exceed the predetermined maximum.

References Cited in the file of this patent
UNITED STATES PATENTS

| 2,323,876 | Ricket | July 6, 1943 |
| 2,395,489 | Major | Feb. 26, 1946 |
| 2,519,081 | Skarstrom | Aug. 15, 1950 |

UNITED STATES PATENT OFFICE
CERTIFICATE OF CORRECTION

Patent No. 3,111,837                      November 26, 1963

Norman Evans et al.

It is hereby certified that error appears in the above numbered patent requiring correction and that the said Letters Patent should read as corrected below.

Column 6, line 5, for "dispenser" read -- disperser --.

Signed and sealed this 21st day of April 1964.

(SEAL)
Attest:
ERNEST W. SWIDER

Attesting Officer

EDWARD J. BRENNER

Commissioner of Patents

UNITED STATES PATENT OFFICE
CERTIFICATE OF CORRECTION

Patent No. 3,111,837 November 26, 1963

Norman Evans et al.

It is hereby certified that error appears in the above numbered patent requiring correction and that the said Letters Patent should read as corrected below.

Column 6, line 5, for "dispenser" read -- disperser --.

Signed and sealed this 21st day of April 1964.

(SEAL)
Attest:

ERNEST W. SWIDER

Attesting Officer

EDWARD J. BRENNER

Commissioner of Patents